Dec. 30, 1941.   H. S. POLIN   2,267,838
MODIFICATION OF THE MAGNETIC CHARACTERISTICS OF SHIPS
Filed Aug. 7, 1940
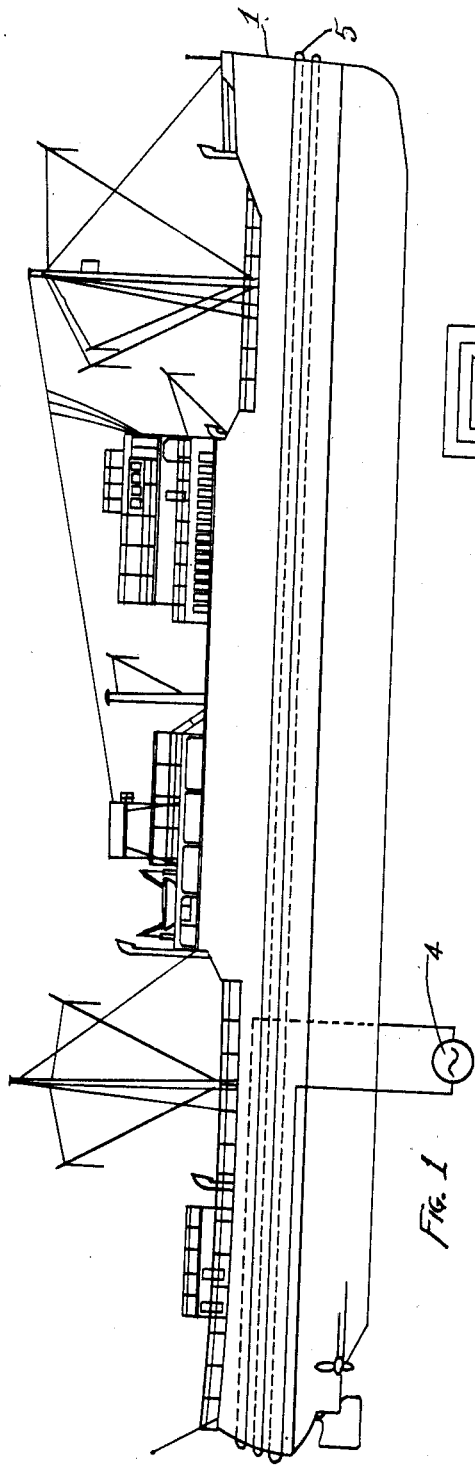
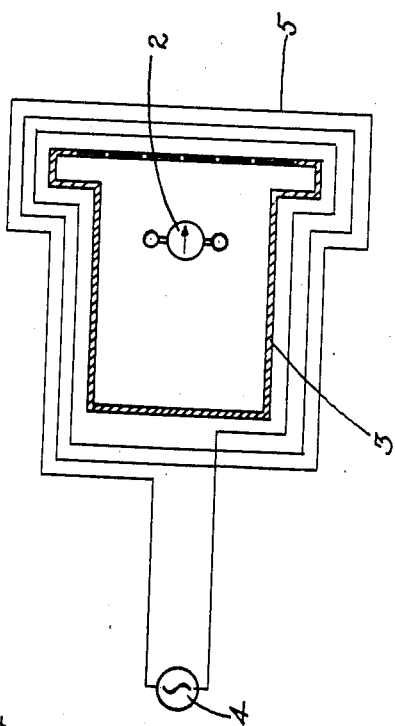
INVENTOR.
HERBERT S. POLIN
BY Ward, Crosby & Neal
ATTORNEYS.

Patented Dec. 30, 1941

2,267,838

UNITED STATES PATENT OFFICE 2,267,838

MODIFICATION OF THE MAGNETIC CHARACTERISTICS OF SHIPS

Herbert S. Polin, New York, N. Y.

Application August 7, 1940, Serial No. 351,664

8 Claims. (Cl. 33—225)

This invention relates to novel methods and apparatus arrangements for controlling deviations of magnetic compasses; and more particularly to methods for automatically nullifying the local magnetic influences which usually impair the operation of the compass and cause it to give faulty indications of direction. It also has for its object a method and means by which a normally magnetic or magnetically susceptible body, may be rendered and maintained substantially ineffective magnetically upon magnetic needles or the like.

An object of my invention is to provide methods and means by virtue of which true and correct operation of the compass is at all times assured, regardless of local conditions which ordinarily produce deviations; the invention being adapted further to render unnecessary most or all of the compensating magnets now generally used to facilitate adjustment and correction of the compass.

The purpose of the magnetic needle when used for navigating ships and in other fields is, of course, to indicate direction by pointing exactly toward the magnetic north. In practice, however, this precise result is difficult to obtain, because numerous disturbing factors impel the needle, instead of allowing it to point towards the magnetic north pole, so that it takes positions to one side or the other of the true magnetic indication.

A vessel constructed of magnetic materials may be in whole or in part susceptible to new magnetic influences with each change of heading of the ship. Thus a vessel which has had its compass compensated for a north-south error while proceeding on that bearing, and has its compass compensated for an error in the east-west direction while proceeding on such a bearing, may be unable to reproduce its compass correction when immediately returning to the north-south bearing. This arises from the magnetic susceptibility of parts of the vessel sufficiently adjacent the compass to impose upon the new magnetic forces operating on the north-south course a residuum of the magnetic characteristic established upon the vessel while proceeding on its east-west course. Some magnetic materials have greater magnetic reluctance than others, and the time-period necessary for the acquisition or loss of a magnetic characteristic imposed upon the vessel by the earth's magnetic field may vary under differing conditions in a multiplicity of ways.

The inventor was requested by the United States Coast Guard to study the compass problem aboard an entire class of some 30 steel vessels built at various yards throughout the United States. These vessels would have their compasses adjusted and proceed to sea in accordance with their prescribed duties, but in a few days would show compass errors of as much as 20 degrees on some headings. The compass would be readjusted only to evidence some hours or days later a complete new set of errors. It was found that the steel deck housing comprising the navigating bridge was sufficiently close to the compasses to influence them, and that the character of steel from which the navigating quarters were constructed was of a particularly magnetically susceptible composition. Since this condition is merely an exaggerated instance of that found on every vessel containing magnetic materials, the solution for this problem was developed to take the form of the herein described invention.

My invention eliminates the need for checking and correcting of the compass, by neutralizing the factors which heretofore have made such checking and correction necessary. I thus maintain in the neighborhood of the compass, conditions under which correct operation can always be had despite local causes of deviations, and I can even dispense with the usual compensating magnets which have heretofore been required.

A further object of the invention may be to render the hull of the vessel itself in a state of magnetic transiency, so controlled that it may exert no effective magnetic influence upon any magnetically susceptible material or magnetically responsive device within or adjacent the vessel.

Other objects and advantages of the invention will be set forth in the description that follows, and the novel features of the invention will be defined in the appended claims. This disclosure, however, is explanatory only, and various modifications be made in the arrangements employed or method followed, without departing from the principle of the invention or exceeding its scope.

On the drawing, Fig. 1 shows in outline, the hull of a ship on which a compass is carried; apparatus for assuring the correct operation of the compass being included. Fig. 2 is a horizontal sectional view through the navigating quarters of the ship, showing the position of the compass therein, and showing another manner in which the invention may be applied.

Referring to the drawing in further detail, I indicates the hull of a ship which can be assumed to contain more or less iron, or be wholly constructed of iron, the compass being indicated at 2 on the fore-and-aft center line of the vessel. If the ship is wholly of iron, or if the hull contains a great deal of iron as indicated at 3, incorrect operation of the compass must frequently ensue. This defective operation can be due to magnetism induced in the iron 3 by hammering and riveting when the ship is constructed, or by the inductive effect of the earth's magnetic lines of force when the ship is in motion, or to other causes. In any case, the presence of material causing magnetic fields other than the magnetic force of the earth in proximity to the compass 2 will cause the compass to indicate falsely, and if a correction is not made, the vessel will go off her true course in consequence.

I have found that such disturbing influences can be nullified or eliminated by the use of electrical apparatus disposed to continuously subject the iron in the hull of the ship near the compass to an alternating or oscillating electrical field which eliminates the causes of the deviations, yet has no effect upon the response of the compass to the earth's field. This apparatus comprises an electric generator 4, such as an alternating-current dynamo connected in circuit with conductors 5 which are placed in inductive relationship to the hull of the vessel or to the navigating bridge or to both. The desired result is accomplished by sending an alternating current through the conductors which are wound about the hull or navigating bridge, of a current density sufficient to develop the necessary gauss units to substantially nullify the magnetism which would otherwise occur in the metallic mass involved, at least to the extent necessary to prevent observable compass deviations. In the instance of the compass, it is now free of any force except that due to the earth's field. The compass will therefore always point to the magnetic north pole (except of course for variations in the earth's field in particular geographical locations), and deviations due to magnetization of local objects never take place.

At the present time, when most ships are built of iron, the chief influences which disturb the operation of the magnetic needle are easily understood. Whenever a metallic conductor is moved across a magnetic field, an E. M. F. is induced in it. Currents thus are generated in the iron of a ship whenever any part of it is moved more or less transversely to the direction of the earth's magnetic lines of force on that part of the earth's surface where the ship is travelling. The currents thus generated in the iron of the hull can produce magnetic effects in various places, and the poles thus established will naturally affect the compass 2. The operation of the above described apparatus prevents any disturbing magnetic influences capable of affecting the compass, from arising in any part of the hull of the ship.

The periodicity or frequency of the current delivered by the alternator 4 must of course be greater than the natural period of the compass. Since the period of any ordinary compass card is usually slow, the necessary frequency of the current delivered to the conductors 6 can of course readily be attained, and a suitable strength of the alternating field for a particular vessel may also be easily determined by trial.

The utility of the invention will now be apparent to anyone familiar with problems of navigation, and the difficulties which arise when deviations of the compass occur. My invention overcomes the deviation difficulties heretofore existing, in a simple and thoroughly efficient manner. It can be readily be installed on any ship with any type of magnetic compass now on the market, and the results in every instance are reliable and certain.

The invention is, of course, not restricted to ships, but may be put to use in any relation where indications of geographical direction are required, or where the control of the magnetic fields caused by magnetization of a vessel is desirable.

Having described my invention, what I believe to be new and desire to secure and protect by Letters Patent of the United States is:

1. The method of preventing deviations of a magnetic compass due to the magnetization of magnetic material in the vicinity of the compass, which comprises subjecting said material to an alternating magnetic field of a frequency greater than the natural period of the compass, and continuing to maintain said alternating field to maintain alternating magnetization of said material sufficient to prevent such deviations, but without materially effecting the response of the compass to the earth's field.

2. The method of preventing deflections of a magnetically responsive element having a natural period of movement, which deflections are due to the presence in the vicinity, of ferromagnetic structure on a ship, comprising: arranging about such structure a coil extending in a generally horizontal plane, and maintaining an alternating current in such coil of a frequency greater than said natural period and of a strength preventing said deflections.

3. In combination with a moving craft carrying a magnetic compass and also carrying magnetically susceptible material, means for preventing deviations of the compass due to the magnetization of said material, comprising electrical conductors in inductive relation to said material, and means continuously supplying through said conductors an alternating current of substantially constant amplitude and of a frequency greater than the natural period of the compass.

4. Apparatus for preventing deflections of a magnetically responsive element incapable of response to alternating fields of above a substantially predetermined frequency, which deflections are due to the presence of ferromagnetic ship structure in the vicinity of the element, comprising: a coil arranged about such structure and extending in a generally horizontal direction, and means continuously supplying in said coil an alternating current of a frequency above said predetermined frequency and of a strength preventing said deflections.

5. The method of immunizing a pivotally supported directional magnetic element against the action of magnetic masses in the vicinity, which comprises: causing an alternating magnetic flux to traverse said masses, said alternating flux having a periodicity which is greater than the natural periodicity of said directional element, and having a substantially constant amplitude sufficient to prevent said magnetic masses from materially influencing said directional element.

6. The method of immunizing a pivotally supported directional magnetic element against the action of magnetic masses in one vicinity, which comprises: causing an alternating magnetic flux to traverse said masses without appreciably traversing said directional element, said alternating flux having a periodicity which is high compared to the natural periodicity of said directional element, and said flux being maintained with an amplitude sufficient to prevent said magnetic masses from materially affecting said directional element.

7. Method of immunizing a ship's magnetic compass against deviation effects arising from the magnetic masses of the ship's structure, which comprises: causing an alternating magnetic flux to traverse said masses without materially affecting response of the compass to the earth's field, said alternating flux having a periodicity which is high compared to the natural periodicity of the compass, and said flux being maintained with a strength preventing said magnetic masses from materially affecting the compass.

8. In combination, a pivotally supported directional magnetic element, a mass of magnetic material in the vicinity thereof, and means for immunizing said element against the magnetic action of said material, including means for causing an alternating magnetic flux to traverse said material without appreciably traversing said directional element, said flux having a periodicity which is high compared to the natural periodicity of said directional element, and being constantly maintained at an amplitude sufficient to prevent said magnetic material from affecting said directional element.

HERBERT S. POLIN.